(12) United States Patent
Paolini, Jr. et al.

(10) Patent No.: US 10,962,816 B2
(45) Date of Patent: Mar. 30, 2021

(54) FLEXIBLE COLOR-CHANGING FIBERS AND FABRICS

(71) Applicant: E Ink Corporation, Billerica, MA (US)

(72) Inventors: Richard J. Paolini, Jr., Framingham, MA (US); Mihai Ibanescu, Somerville, MA (US); Yoel Fink, Brookline, MA (US); Michael Rein, Boston, MA (US)

(73) Assignees: E Ink Corporation, Billerica, MA (US); Advanced Functional Fabrics of America, Inc., Cambridge, MA (US)

( * ) Notice: Subject to any disclaimer, the term of this patent is extended or adjusted under 35 U.S.C. 154(b) by 0 days.

(21) Appl. No.: 15/997,740

(22) Filed: Jun. 5, 2018

(65) Prior Publication Data

US 2018/0364518 A1    Dec. 20, 2018

Related U.S. Application Data

(60) Provisional application No. 62/520,932, filed on Jun. 16, 2017.

(51) Int. Cl.
  *G02F 1/1333*    (2006.01)
  *G02F 1/01*    (2006.01)
  (Continued)

(52) U.S. Cl.
  CPC ......... *G02F 1/133348* (2013.01); *D01D 5/24* (2013.01); *D01D 11/06* (2013.01); *D01F 1/04* (2013.01); *D01F 6/64* (2013.01); *G02F 1/0115* (2013.01); *D10B 2331/30* (2013.01); *D10B 2401/16* (2013.01); *D10B 2401/20* (2013.01); *G02F 1/167* (2013.01); *G02F 1/1675* (2019.01); *G02F 2201/02* (2013.01); *G02F 2202/022* (2013.01)

(58) Field of Classification Search
  None
  See application file for complete search history.

(56) References Cited

U.S. PATENT DOCUMENTS 3,852,401 A    12/1974    Suzuki et al.
4,659,619 A *  4/1987    Tate ................... B43L 1/008
                                            346/21

(Continued)

FOREIGN PATENT DOCUMENTS

CN    1807707 A    7/2006
JP    2004070206 A    3/2004
KR    20180013007 A1    7/2018

OTHER PUBLICATIONS

Korean Intellectual Property Office, PCT/US2018/037693, International Search Report and Written Opinion, dated Mar. 6, 2019.

(Continued)

*Primary Examiner* — David D Davis
(74) *Attorney, Agent, or Firm* — Brian D. Bean

(57) ABSTRACT

A color-changing flexible fiber that can be incorporated into fabrics and other woven materials. The color changing flexible fibers are hollow and include at least two wire electrodes integrated into the wall of the hollow fiber that provide an electrical potential across an electro-optic medium disposed inside the hollow fiber. The electro-optic medium includes a non-polar solvent and at least one set of charged particles.

14 Claims, 7 Drawing Sheets

(51) Int. Cl.
*D01D 5/24* (2006.01)
*D01F 1/04* (2006.01)
*D01F 6/64* (2006.01)
*D01D 11/06* (2006.01)
*G02F 1/1675* (2019.01)
*G02F 1/167* (2019.01)

(56) References Cited

U.S. PATENT DOCUMENTS

| | | |
|---|---|---|
| 4,756,958 A | 7/1988 | Bryant et al. |
| 4,815,355 A | 3/1989 | Cavaness |
| 4,917,920 A | 4/1990 | Ono et al. |
| 5,760,761 A | 6/1998 | Sheridon |
| 5,777,782 A | 7/1998 | Sheridon |
| 5,808,783 A | 9/1998 | Crowley |
| 5,961,804 A | 10/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,072,619 A | 6/2000 | Kiryuschev et al. |
| 6,097,531 A | 8/2000 | Sheridon |
| 6,120,588 A | 9/2000 | Jacobson |
| 6,120,839 A | 9/2000 | Comiskey |
| 6,128,124 A | 10/2000 | Silverman |
| 6,137,467 A | 10/2000 | Sheridon |
| 6,147,791 A | 11/2000 | Sheridon |
| 6,241,921 B1 | 6/2001 | Jacobson |
| 6,262,706 B1 | 7/2001 | Albert |
| 6,262,833 B1 | 7/2001 | Loxley |
| 6,300,932 B1 | 10/2001 | Albert |
| 6,301,038 B1 | 10/2001 | Fitzmaurice |
| 6,323,989 B1 | 11/2001 | Jacobson |
| 6,377,387 B1 | 4/2002 | Duthaler |
| 6,515,649 B1 | 2/2003 | Albert |
| 6,538,801 B2 | 3/2003 | Jacobson |
| 6,542,284 B2 | 4/2003 | Ogawa |
| 6,580,545 B2 | 6/2003 | Morrison |
| 6,652,075 B2 | 11/2003 | Jacobson |
| 6,693,620 B1 | 2/2004 | Herb |
| 6,721,083 B2 | 4/2004 | Jacobson |
| 6,727,881 B1 | 4/2004 | Albert |
| 6,756,120 B2 | 6/2004 | Smith et al. |
| 6,822,782 B2 | 11/2004 | Pratt |
| 6,866,760 B2 | 3/2005 | Paolini, Jr. |
| 6,870,657 B1 | 3/2005 | Fitzmaurice |
| 6,870,661 B2 | 3/2005 | Pullen |
| 6,922,276 B2 | 7/2005 | Zhang |
| 6,950,220 B2 | 9/2005 | Abramson et al. |
| 6,982,178 B2 | 1/2006 | LeCain et al. |
| 7,002,728 B2 | 2/2006 | Pullen |
| 7,006,063 B2 | 2/2006 | Maeda |
| 7,012,600 B2 | 3/2006 | Zehner |
| 7,012,735 B2 | 3/2006 | Honeyman |
| 7,038,655 B2 | 5/2006 | Herb |
| 7,075,502 B1 | 7/2006 | Drzaic |
| 7,116,318 B2 | 10/2006 | Amundson |
| 7,170,670 B2 | 1/2007 | Webber |
| 7,173,752 B2 | 2/2007 | Doshi |
| 7,180,649 B2 | 2/2007 | Morrison |
| 7,230,750 B2 | 6/2007 | Whitesides |
| 7,230,751 B2 | 6/2007 | Whitesides |
| 7,236,290 B1 | 6/2007 | Zhang |
| 7,236,291 B2 | 6/2007 | Kaga et al. |
| 7,247,379 B2 | 7/2007 | Pullen |
| 7,312,784 B2 | 12/2007 | Baucom |
| 7,312,916 B2 | 12/2007 | Pullen |
| 7,321,459 B2 | 1/2008 | Masuda |
| 7,339,715 B2 | 3/2008 | Webber |
| 7,375,875 B2 | 5/2008 | Whitesides |
| 7,411,719 B2 | 8/2008 | Paolini, Jr. |
| 7,411,720 B2 | 8/2008 | Honeyman et al. |
| 7,420,549 B2 | 9/2008 | Jacobson |
| 7,453,445 B2 | 11/2008 | Amundson |
| 7,531,235 B2 | 5/2009 | Den Toonder et al. |
| 7,532,388 B2 | 5/2009 | Whitesides et al. |
| 7,535,624 B2 | 5/2009 | Amundson et al. |
| 7,579,078 B2 | 8/2009 | Hartmann et al. |
| 7,679,814 B2 | 3/2010 | Paolini, Jr. |
| 7,746,544 B2 | 6/2010 | Comiskey |
| 7,839,564 B2 | 11/2010 | Whitesides et al. |
| 7,848,006 B2 | 12/2010 | Wilcox |
| 7,903,319 B2 | 3/2011 | Honeyman |
| 8,009,348 B2 | 8/2011 | Zehner |
| 8,018,640 B2 | 9/2011 | Whitesides |
| 8,107,153 B2* | 1/2012 | Sotzing ............... G02F 1/1533 359/265 |
| 8,115,729 B2 | 2/2012 | Danner |
| 8,199,395 B2 | 6/2012 | Whitesides |
| 8,207,511 B2* | 6/2012 | Bortz ..................... C09K 11/02 250/473.1 |
| 8,270,064 B2 | 9/2012 | Feick |
| 8,305,341 B2 | 11/2012 | Arango |
| 8,319,759 B2 | 11/2012 | Jacobson |
| 8,390,918 B2 | 3/2013 | Wilcox |
| 8,582,196 B2 | 11/2013 | Walls |
| 8,593,718 B2 | 11/2013 | Comiskey |
| 8,769,836 B2* | 7/2014 | Donovan ............. A43B 1/0027 33/3 A |
| 9,366,935 B2 | 6/2016 | Du |
| 9,372,380 B2 | 6/2016 | Du |
| 9,633,579 B2* | 4/2017 | McLeod ................ G01N 21/84 |
| 9,733,541 B2 | 8/2017 | Shuto et al. |
| 9,777,201 B2 | 10/2017 | Widger |
| 9,863,920 B2* | 1/2018 | Gaynor .................... A24D 3/04 |
| 2001/0009352 A1* | 7/2001 | Moore .................. C03B 37/025 313/582 |
| 2003/0194578 A1 | 10/2003 | Tam et al. |
| 2005/0012980 A1 | 1/2005 | Wilcox |
| 2007/0195546 A1* | 8/2007 | Den Toonder ............ D01F 1/04 362/551 |
| 2007/0197115 A1 | 8/2007 | Eves et al. |
| 2008/0316580 A1 | 12/2008 | Gillies et al. |
| 2009/0009852 A1 | 1/2009 | Honeyman |
| 2009/0206499 A1 | 8/2009 | Whitesides |
| 2009/0225398 A1 | 9/2009 | Duthaler |
| 2010/0148385 A1 | 6/2010 | Balko |
| 2012/0274616 A1* | 11/2012 | Scribner ........... G02F 1/133305 345/205 |
| 2012/0293858 A1 | 11/2012 | Telfer, Jr. |
| 2014/0011913 A1 | 1/2014 | Du |
| 2015/0036207 A1* | 2/2015 | Zhou ...................... C09D 11/10 359/296 |
| 2015/0210873 A1* | 7/2015 | Zhou ...................... C09D 11/10 359/296 |
| 2015/0227017 A1* | 8/2015 | Shuto ............... G02F 1/133348 359/296 |
| 2016/0085132 A1 | 3/2016 | Telfer et al. |
| 2017/0088758 A1 | 3/2017 | Bzowej et al. |
| 2018/0271180 A1 | 9/2018 | Kim et al. |
| 2018/0363173 A1 | 12/2018 | Keating et al. |
| 2019/0146299 A1* | 5/2019 | Kaino ...................... D01F 1/06 359/296 |

OTHER PUBLICATIONS

Wood, D., "An Electrochromic Renaissance?" Information Display, 18(3), Mar. 24, 2002.

Hayes, R.A. et al., "Video-Speed Electronic Paper Based on Electrowetting", Nature, vol. 425, No. 25, pp. 383-385 (Sep. 2003).

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 345-348, (Jun. 5, 2002).

Kitamura, T. et al., "Electrical toner movement for electronic paper-like display", Asia Display/IDW '01, pp. 1517-1520, Paper HCS1-1 (2001).

(56) References Cited

OTHER PUBLICATIONS

Yamaguchi, Y. et al., "Toner display using insulative particles charged triboelectrically", Asia Display/IDW '01, pp. 1729-1730, Paper AMD4-4 (2001).

* cited by examiner

FLEXIBLE COLOR-CHANGING FIBERS AND FABRICS

CROSS-REFERENCE TO RELATED APPLICATIONS

This application claims the benefit of and priority to U.S. Provisional Application having Ser. No. 62/520,932, filed on Jun. 16, 2017, the content of which is incorporated by reference herein in its entirety. The contents of all co-pending and published patent applications and issued patents mentioned below are also incorporated by reference herein in their entireties.

STATEMENT OF U.S. GOVERNMENT SUPPORT

This invention was made with U.S. Government support under Agreement No. W15QKN-16-3-0001 awarded by the ACC-NJ. The U.S. Government has certain rights in the invention.

BACKGROUND OF INVENTION

There are many applications for clothing that can change on demand. If modern fabrics were able to change color on demand, a consumer could dramatically reduce the number of articles of clothing that he or she purchased in a lifetime. It would no longer be necessary to have, for example, three different blouses of nearly identical cut but different color. The consumer could simply chose the color (or pattern) needed depending upon the event, season, etc. In this way, color changing fabrics could greatly reduce the environmental impact of clothing. It is estimated that Americans currently discard about 14 million tons of clothing per year into landfills. Additionally, replacing these clothes with each new fashion season is resource-intensive—regardless of the source of the fabric, e.g., cotton, wool, or petrochemicals. Other applications for color changing clothing include camouflage and sportswear. For example, a baseball team would no longer require two different uniforms, the color could be changed depending upon whether the team was home or away.

A variety of technologies have been identified for creating fabrics that are able to reversibly change colors. These technologies include thermochromic dyes, which change color when exposed to different temperatures, photochromic dyes, which change color when exposed to sunlight, integrated LEDs, which can be illuminated on demand by providing power to the diodes, and liquid crystal inks, which allow different colors to be shown (or not) with the presence of a supplied electric field. These technologies have been highlighted in various prototypes, but only the thermochromic dyes have been widely incorporated into clothing. See "Hypercolor" t-shirts sold by Generra Sportswear. However, because the thermochromic clothing is heat sensitive, the color patterns are variable. For example, the underarms of a t-shirt having thermochromic ink may be consistently a different shade, drawing attention to that area. Thus, there still remains a need for inexpensive and robust fabrics that can change color on demand.

SUMMARY OF INVENTION

The invention overcomes the shortcomings of the prior art by providing flexible fibers that can be switched between colors on demand. The fibers may be incorporated into fabrics by weaving, knitting, embroidering, thermoforming, or matting. The fibers can be incorporated into other materials to achieve strength, breathability, or stretch as demanded by the application. When a suitable electric field is provided, the color of the fiber will switch. Because the pigments are bistable, it is not necessary to provide constant power to maintain the color state. Rather, once the fabric is switched, it is stable for long periods of time, e.g., days or weeks.

Accordingly, the invention provides a flexible color-changing fiber including a hollow fiber comprising at least two electrically-isolated conductive wires that are integrated into the wall of the hollow fiber along with an electro-optic medium disposed within the fiber, wherein the electro-optic medium is capable of being switched by an electric field. The electro-optic medium includes a non-polar solvent and at least one set of charged pigment particles. In some embodiments, the electro-optic medium includes first and second sets of charged pigment particles that have a charge and color different from the first charged pigment particles. Additional sets of particles can be added to the electro-optic medium. The hollow fibers may be made of various polymers, for example polycarbonate. In some embodiments, the hollow fibers have a substantially rectangular cross section and include four electrically-isolated conductive wires. In embodiments having a substantially rectangular cross section and four electrically-isolated conductive wires, the wires may be located approximately ¼ the width of the larger inner dimension inward from the inner edge of the wall of the hollow fiber. The non-polar solvent is often a mixture of hydrocarbons, and the electro-optic medium may also include charge control agents.

The creation of fibers containing bistable electronic ink and the subsequent incorporation of the fibers into fabrics and apparel, etc., would enable switching of the fabrics and then disconnecting them from electronics because the display is stable with no power. Accordingly, the drive electronics would not have to integrated into the fabric unless mobile switching was desired. Thus, in some embodiments, a switching box, which could be battery powered, is a detachable accessory. The lack of driving electronics greatly simplifies laundering the fibers while also increasing durability. If it is desirable to have the device changing actively while worn, the switching electronics could be included in the garment, but would only have to be turned on for brief periods during the updates.

These and other aspects of the present invention will be apparent in view of the following description.

BRIEF DESCRIPTION OF DRAWINGS

The drawing Figures depict one or more implementations in accord with the present concepts, by way of example only, not by way of limitations. In the figures, like reference numerals refer to the same or similar elements.

DETAILED DESCRIPTION

The invention provides flexible color-changing fibers that can be incorporated into textiles and other materials. The ability to include electronic components into the fiber, i.e., wire electrodes, is useful for attaining a practical and economical fiber based display. Many previous attempts at making fiber-based displays or switching fabrics have required substantial amounts of dielectric structural materials between the electrodes and the functional electrophoretic material. The described invention makes such complicated structures unnecessary.

Figure 1A:
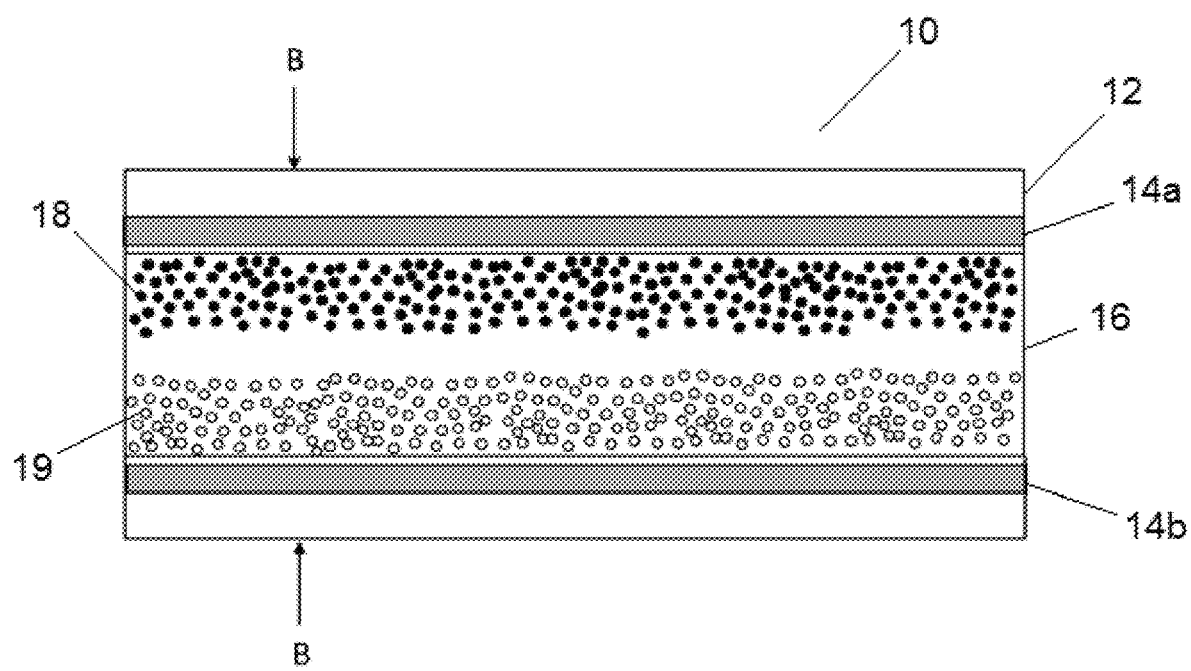
FIG. 1A is an illustration of a side view of a flexible color-changing fiber according to an embodiment of the invention. The fiber is filled with an electro-optic medium including oppositely-charged colored pigments that can be caused to move toward (or away) from electrically-charged wire electrodes.
Figure 1B:
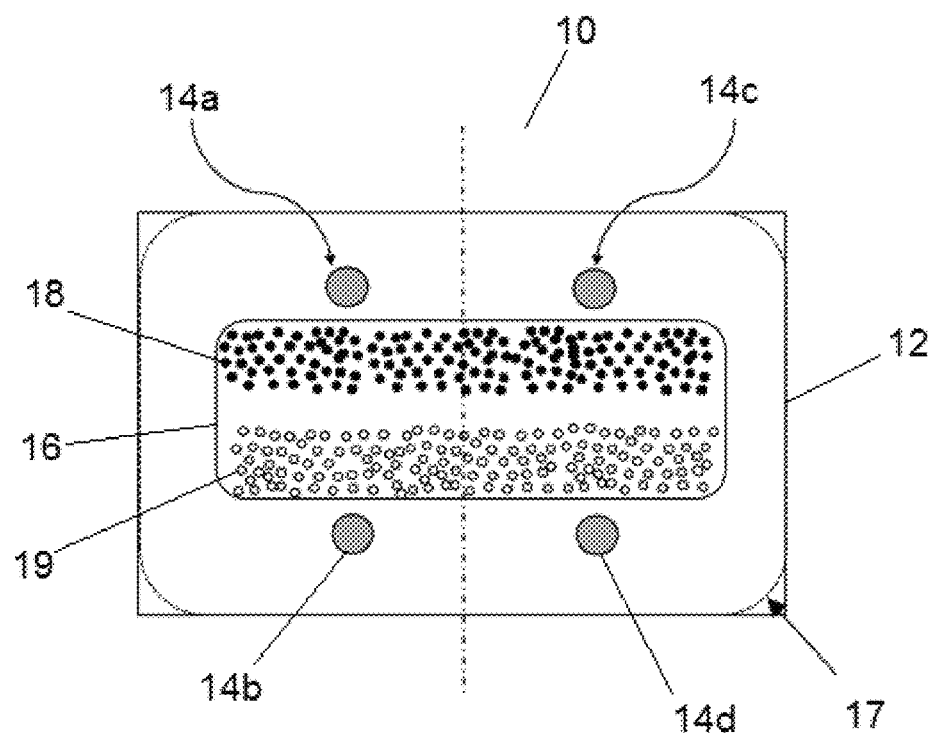
FIG. 1B is a cross-sectional view of a flexible color-changing fiber according to another embodiment of the invention. The fiber is filled with an electro-optic medium including oppositely-charged colored pigments that can be caused to move toward (or away) from electrically-charged wire electrodes. The wires are optionally located equidistant between the interior wall and the midline.

FIG. 1A shows a side cross-sectional view of a switching fiber 10 of the invention. An electro-optic medium 16 including a non-polar solvent and two types of charged pigment particles 18, 19 is shown disposed between the walls of hollow fiber 12. In the embodiment shown in FIG. 1A, the first set of particles 19 are white and the second set of particles 18 are black, however many other colors can be achieved, as described below. The fiber 10 includes at least two electrodes 14a, 14b, which provide an electric field across the electro-optic medium, thereby causing one pigment, or the other, to move to a side of the fiber 10. FIG. 1B shows a cross section taken at B-B of FIG. 1A. In FIG. 1B, the shape of the fiber 10 and the location of the wire electrodes 14a, 14b, 14c, 14d is easily visualized. While the black pigment 18 is shown toward the top of both figures, it is understood that with appropriate switching, the white pigment 19 can be caused to move toward the top of the figures. Additionally, it is possible to have mixed black and white, i.e., providing grayscale levels, as described in some of the patents by E Ink Corporation, listed below.

Each flexible fiber includes a cavity formed from a material capable of containing the electrophoretic liquid. In some embodiments, the fiber has a substantially rectangular cross-section and the inner internal cavity has a substantially rectangular cross-section as well. However, other cross sectional shapes are also possible, such as ovoid or circular. The rectangular cross section may have sharp edges or they may be slightly rounded edges 17, as shown in FIG. 1B. It is desirable to have the fiber be thin enough for weaving into devices but thick enough to enable an active switching cavity. It is also desirable to have the walls of the fiber as thin as possible to maximize the optical switching volume relative to the thickness of the fiber. However, if the walls are too thin the fiber will fail, either by cracking, snapping, or by releasing one of the wire electrodes. Toward that end, it is desirable for the fiber to be approximately 2 mm×1 mm thick, or less, with an inner cavity of 1 mm×0.5 mm, or less. In a preferred embodiment, the fiber can be about 0.8 mm×0.5 mm and the cavity about 0.4 mm×0.15 mm. The electrode wires in such fibers may have a diameter of 50 µm. In these fibers, the fraction of the cavity width that is obscured by the (opaque) electrode wires is approximately 25% (2*50 µm/400 µm). In a more preferred embodiment, the fiber can be about 0.54 mm×0.31 mm and the cavity about 0.40 mm×0.10 mm. The electrode wires in such fibers may have a diameter of 40 µm. In these fibers, the fraction of the cavity width that is obscured by the (opaque) electrode wires is approximately 20% (2*40 µm/400 µm).

After an electric field is applied across the cavity of the fiber in FIG. 1, the top of the fiber will display a different color than the bottom of the fiber. Therefore, when integrating this fiber into a fabric, it is important to be able to control the fiber orientation in order to achieve a consistent color across an area of fabric. When forming a color-changing fabric by weaving fibers with rectangular cross-sections, it is beneficial that the orientation of the fabric is such that the viewing surface of the fabric comprises the sides of the fibers having the wider dimension. Typically the ratio of width to height in cross section is of at least 1.2:1, more preferably 1.5:1, or more, when weaving fibers having a rectangular cross-section according to certain embodiments of the invention.

When applying the fibers according to the various embodiments of the present invention to a finished fabric, such as an embroidery method, the aspect ratio is also important for controlling the orientation of the fiber. For example, a fiber with a rectangular cross-section that is bent may twist. This may be undesired, if it is preferred that the viewing surface of the color-changing fiber remain relatively parallel with the underlying fabric. In this case, it is beneficial for fibers to have a close to square cross-section or a rectangular cross-section where the fiber is deeper than wide when viewed from the normal viewing side to reduce the likelihood of any undesired twisting of the fiber in the fabric.

Each flexible fiber includes at least two conductive wire electrodes running lengthwise along the fiber as close to the cavity as possible without compromising the ability of the wall to mechanically restrain the wire electrodes. The wire electrodes may be formed from tungsten, silver, copper, or other conductive material with good ductility. The electrode cross-section shape may be round, rectangular or other shape that will optimize the uniformity of the electric field across the electro-optic medium. One wire, or set of wires, is on the viewing side of the cavity and the other wire, or set of wires, is located on the opposite side of the cavity. When the ends of the wires are connected to an electrical supply, an electric potential can be created across the cavity to cause a change in optical state of the electronic ink. The wires should be as small as is possible while maintaining enough mechanical strength to survive the fiber making process. In the embodiments of this invention, the tungsten wires may be 100 µm or less in diameter and preferably 50 µm or less in diameter and more preferably 25 µm or less in diameter. The optical benefit of the smaller diameter fibers can be substantial since for a 400 micron wide cavity two 50 micron wires would obscure 25% of the switching area in view and 25 micron wires would only obscure 12.5% of the switching area. In addition, the fibers of smaller diameter are more mechanically flexible which allows for thinner mechanical materials in the fiber to contain the wires and greatly increases the flexibility possible in making the fibers. The fibers can be indefinitely long, for example, 1 meter or longer, e.g., 10 meters or longer, e.g., 100 meters or longer.

In one embodiment of the present invention, a color changing fiber may comprise four conductive electrode wires arranged in two sets of two wires. This structure is exemplified in FIG. 1B, where two wires are located on the viewing side of the cavity of the fiber, and two wires arranged on the reverse side of the cavity. The wires are arranged to each be placed ¼ of the width of the cavity away from the edge of the cavity toward the middle of the fiber. This is also shown in FIG. 1B. This arrangement of electrode wires allows for improved uniformity of the electric field generated by the wires with no portion of the top of the cavity more than ¼ of the width away from an electrode wire. The fraction of the cavity width that is covered by opaque wires is given by the formula f=N*D/W, where N is the number of wires on one side of the cavity, D is the wire diameter and W is the cavity width. It is desirable for the fraction f to be less than 40% and preferably less than 20%.

As mentioned above, the electrodes of the fiber according to the various embodiments of the invention may comprise copper. Copper has a lower modulus compared to tungsten, for example, so copper wires will be more flexible than tungsten wires of equivalent diameter. This flexibility has the secondary effect of requiring less polymeric material to mechanically retain the wires resulting in relatively thinner wires. Copper wires with lower modulus exert less force on the surrounding polymer fiber materials when the fiber is flexed which leads to better mechanical robustness of the fiber when bent. More mechanical robustness is preferred because if the wires break through the polymeric materials of the fiber during flexing, there is a high probability of the wire spanning the cavity of the fiber and creating an electrical contact to another electrode wire in the device. Contact between electrodes spanning the cavity would create an electrical short circuit which causes the fiber to lose switching performance and in many instances lose the ability to switch completely.

Figure 5:
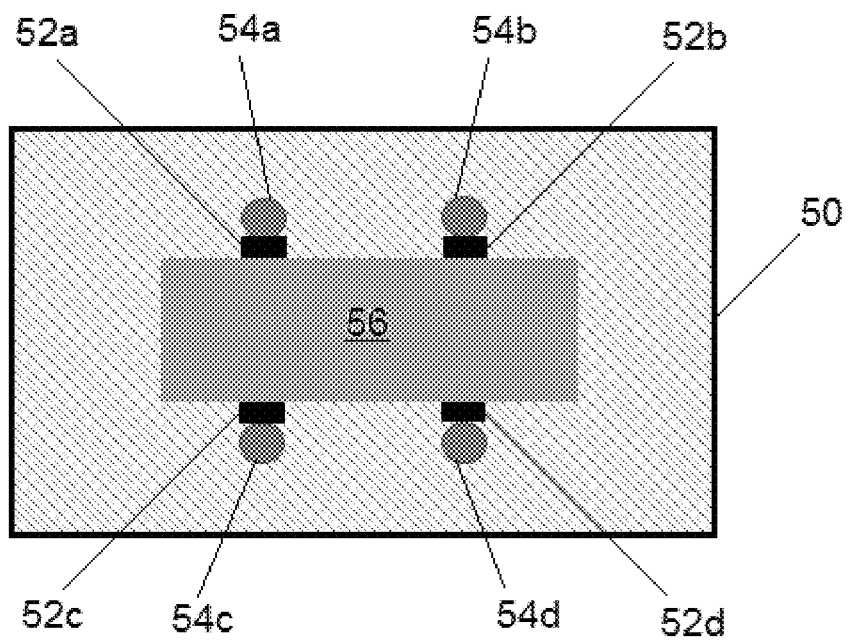
FIG. 5 is a cross-sectional view of a flexible color-changing fiber comprising conductive polymer according to another embodiment of the invention.
Figure 6:
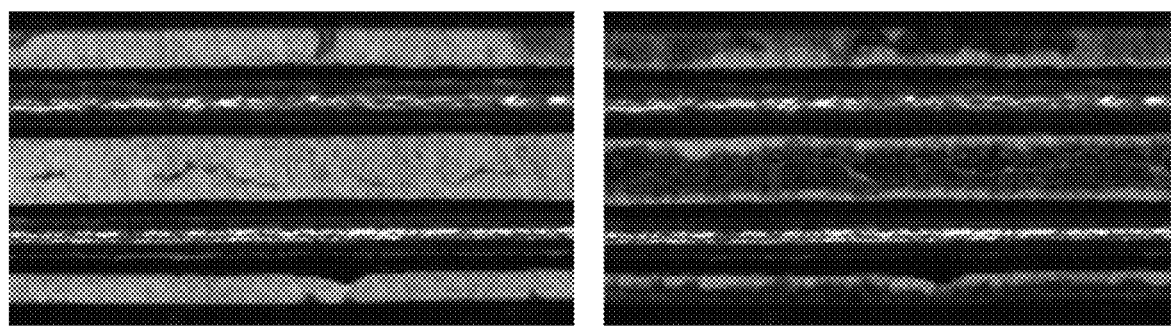
FIG. 6 shows visible light micrographs of a flexible color-changing fiber according to another embodiment of the invention being switched between a light state (left) and a dark state (right).

In another embodiment of the invention shown in FIG. 5, the electrical properties of the polymer material used to mechanically constrain the wires into the fiber are modified to maximize the electric field across the electrophoretic media in the cavity. Specifically, a structural polymer like polycarbonate is filled with a conducting material like carbon past a percolation threshold so that the resulting polymer/carbon blended material 52a, 52b, 52c, 52d becomes conducting. Multiple polymeric materials suitable for fiber formation may be filled with conducting materials and multiple conductors may be used as conductive fillers. The conductive polycarbonate (CPC) material 52a, 52b, 52c, 52d may be disposed between the conductive wires 54a, 54b, 54c, 54d and the cavity 56 of the hollow fiber 50, as illustrated in FIG. 5. Preferably, the width of the CPC material at least on the viewing side of the fiber is approximately equal to the diameter of the conductive wire because the conductive material is opaque and may obscure the electrophoretic media. The CPC material may be integrated into the preform using a stacking and hot-pressing approach, if the hollow fiber material and CPC material are both thermoplastics. For example, according to one processing method, a composite of non-conductive polycarbonate forming the hollow fiber and the conductive polycarbonate materials may be fused together under pressure and/or heat. The CPC allows the fiber to switch at lower voltages compared to polycarbonate lacking any conductive material. FIG. 6 is a photograph of the white and dark states of a fiber with this arrangement. From the photographs, it is apparent that the optical performance may be improved by using wire with a smaller diameter and a narrower strip of CPC, so that the the electrophoretic material in the cavity is less obscured. In some embodiments, the fiber may comprise both CPC material and copper electrodes.

The visual impact of the color changing fiber is proportional to the optical fill factor—the fraction of fiber area or width where the color changing medium is actually visible when the fiber is viewed from outside. Ideally, this optical fill factor would be 100% to maximize the visual impact. The optical fill factor is lowered by the presence of non-transparent materials (e.g. wires) on top of the color change medium and by the non-active wall materials that are needed to contain the color change medium. To increase the optical fill factor, fibers according to some embodiments of the present invention may include features that provide lensing effects. As used herein throughout the specification and the claims, the term "lensing effects" means a feature capable of bending light to obscure the non-active areas and maximize the appearance of active areas of a color-changing fiber.

Figure 7:
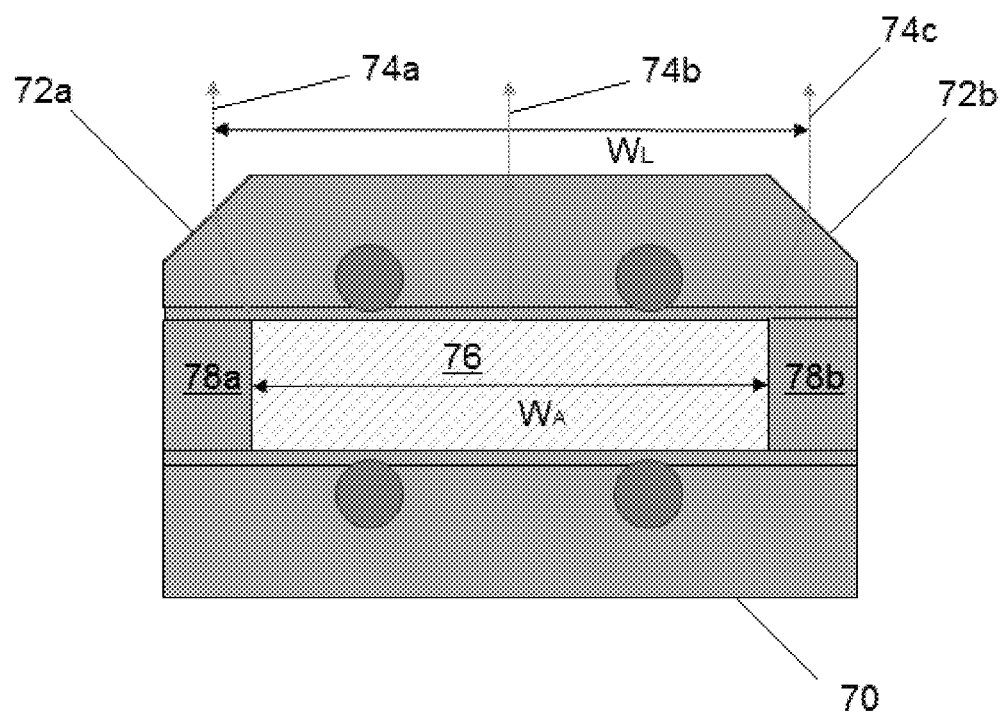
FIG. 7 is a cross-sectional view of a flexible color-changing fiber according to another embodiment of the invention having a geometry that provides a lensing effect.
Figure 8:
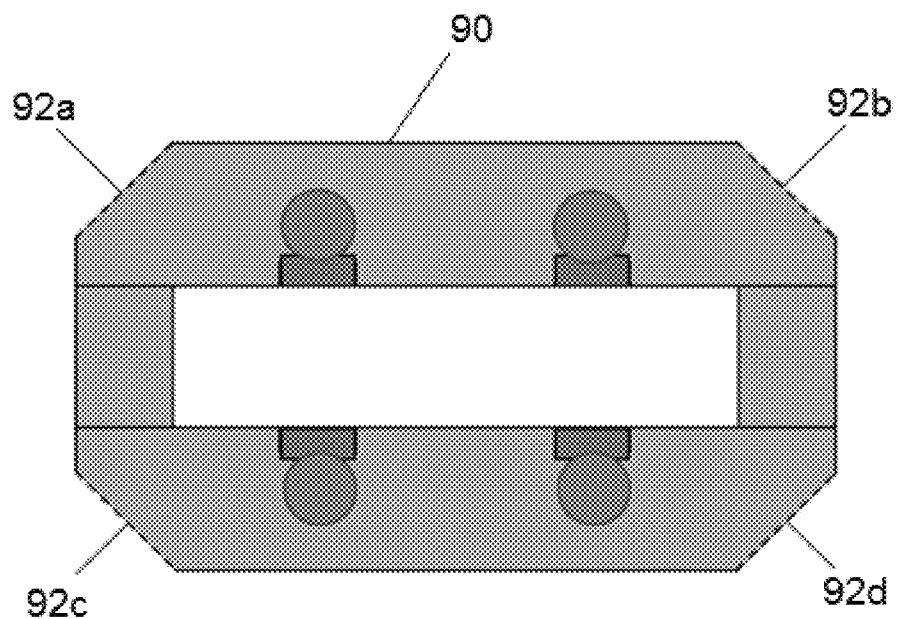
FIG. 8 is a cross-sectional view of a flexible color-changing fiber according to another embodiment of the invention having a geometry that provides a lensing effect.

Lensing effects may be achieved by light refraction at the interface between two different transparent materials. In order to bend the rays of light two conditions are needed: (1) the two materials need to have different refractive indices and (2) the angle between the viewing direction and the plane of the interface needs to be different from 90°. An example of a simple fiber geometry that provides a lensing effect is provided in FIG. 7. The fiber 70 has two top chamfered corners 72a, 72b that are angled at approximately 45° from the top surface. Refracted light 74a, 74b, 74c transmitted through the fiber 70 continue un-deflected at the interface between the fiber 70 and the outside air. Refracted light transmitted through the angled corner regions 72a, 72b are deflected in a way that effectively increases the apparent width ($W_L$) of active medium 76 having an actual width ($W_A$) equal to the width of in the inside cavity. As a result, more of the active medium and less of the non-active walls 78a, 78b are visible from the outside of the fiber 70. Fibers according to various embodiments of the present invention therefore may include one or more chamfered edges. For example, for color changing fabrics used in applications in which the fabric will be viewed on either side, a fiber 90 made according to embodiments of the invention may have four chamfered edges 92a, 92b, 92c, 92d, as illustrated in FIG. 8.

Figure 9:
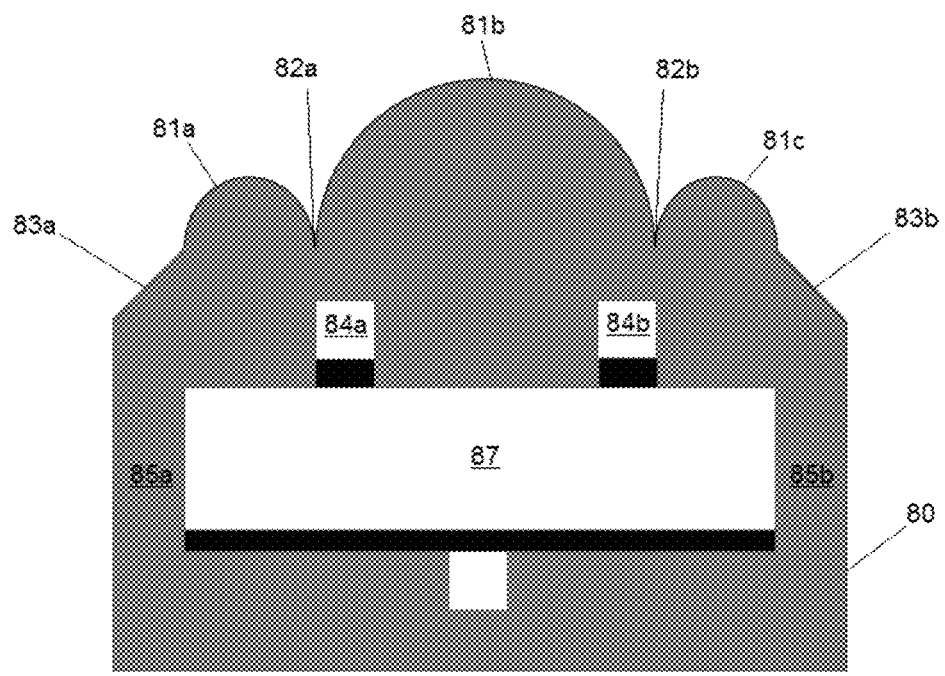
FIG. 9 is a cross-sectional view of a flexible color-changing fiber according to another embodiment of the invention having a geometry that provides a lensing effect.

A fiber structure according to another embodiment of the present invention with a more complex lensing effect is shown in FIG. 9. This structure includes chamfered edges 83a, 83b and curved surfaces 81a, 81b, 81c in the top section of the fiber 80. The chamfered edges 83a, 83b reduce a fraction of non-active walls 85a, 85b that are visible from the outside the fiber 80, and the curved surfaces 81a, 81b, 81c reduce the visibility of the two electrodes 84a, 84b that are present on top of the cavity 87 containing the electrophoretic media by locating the ends of each curved surface 81a, 81b, 81c within the area of the wire electrodes 84a, 84b.

Figure 10:
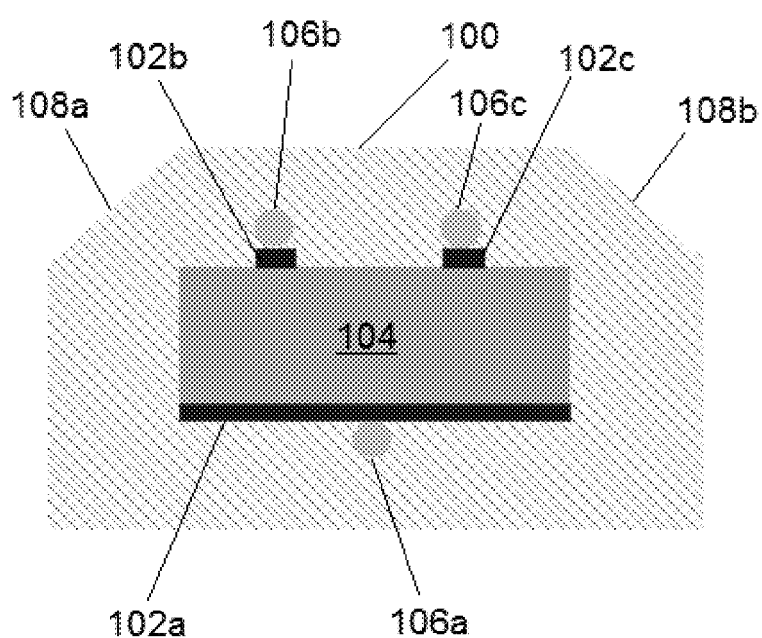
FIG. 10 is a cross-sectional view of a flexible color-changing fiber according to another embodiment of the invention having a geometry that provides a lensing effect, conductive polymer, and copper electrodes.

In a preferred embodiment of the invention, a color changing fiber 100 may comprise CPC material 102a spanning the width of the non-viewing side of the cavity containing the electrophoretic media 104, as illustrated in FIG. 10. A single copper wire 106a may be placed in contact under the CPC material 102 spanning the width of the non-viewing side of the electrophoretic media 104, which reduces the total number of wires 106a, 106b, 106c in the fiber 100 to three and enhances the overall flexibility of the fiber 100. On the viewing side of the fiber 100 there are two copper electrodes 106b, 106c arranged at a distance from either edge of the electrophoretic media 104 about equal to ¼ the width of the electrophoretic media 104 to enhance the electro-optical switching performance and with the CPC material 102b, 102c disposed between the wires 106b, 106c and the cavity containing the electrophoretic media 104. The fiber 100 of this embodiment also has the shaped corners 108a, 108b for the enhanced lensing effect. The combination of the geometric positioning optimization of the wires, copper wires, CPC, lensing, and spanning CPC non-viewing side electrode create a fiber of enhanced flexibility, enhanced electro-optical switching performance and lower voltage operation.

The incorporation of chamfered edges is one feature that is able to provide a lensing effect. Alternatively, lensing can be achieved by coating a light transmissive refracting material over the fiber to cause the refraction of light at the interface between the underlying fiber and the coating. The coating and the fiber should have a difference in refractive indices and the angle between the plane of the interface and the viewing direction between the two materials should be less than 90°.

Figure 11:
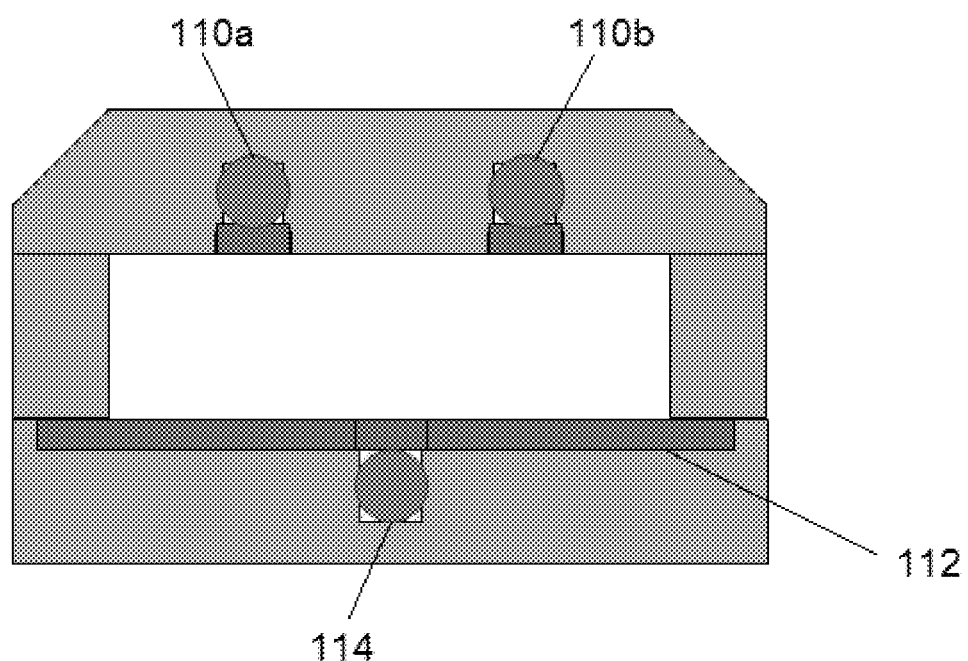
FIG. 11 is a cross-sectional view of a flexible color-changing fiber according to another embodiment of the invention having an insulating layer.

In some applications, such as textiles for apparel, it is possible that a fiber is subjected to high mechanical stresses, such as being bent excessively, kinked or crushed. It is desireable for a whole length of continuous fiber to remain functional even if the fiber is damaged locally. To prevent such damage, a fiber made according to an embodiment of the present invention may include barrier layers to reduce the likelihood of an electrical short between the top and bottom electrodes. For example in FIG. 11, the risk of electrical shorting is reduced by the presence of an electrically insulating layer 112 between the top conducting materials 110a, 110b (wires+conductive polymer) and the bottom conducting materials 114 (wires+conductive materials). The barrier layers may be made of insulating polymer materials, for example polycarbonate. Alternatively, the barrier layer may be made of a partially conducting polymer materials with electrical conductivity larger than that of polycarbonate, but lower than that of conductive polycarbonate (CPC).

Figure 2:
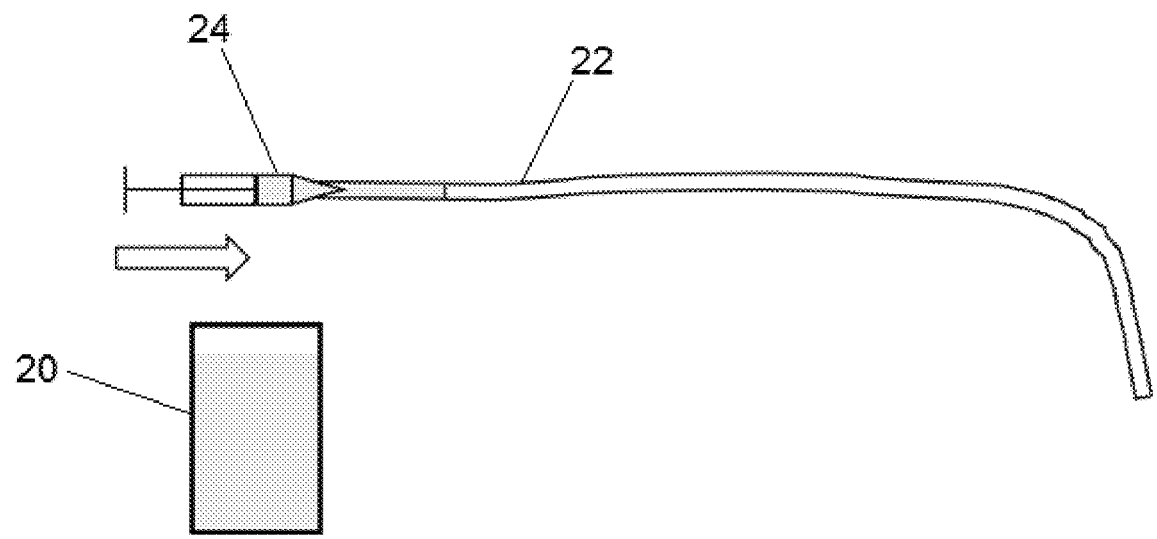
FIG. 2 illustrates a method for filling a flexible color-changing fiber with a microsyringe containing the electro-optic medium.
Figure 3:
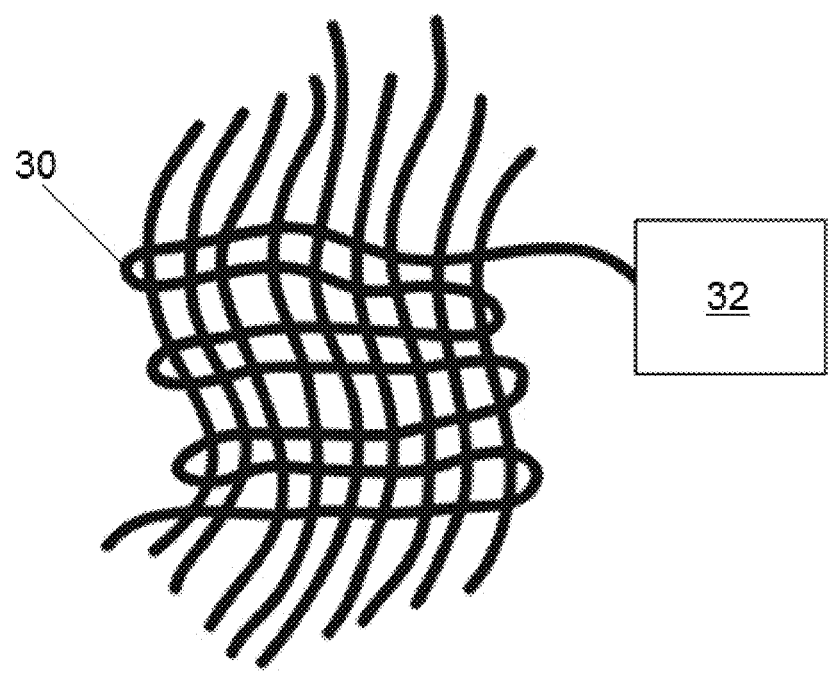
FIG. 3 illustrates a flexible color-changing fiber woven into a fabric and then coupled to driving electronics that allow a user to switch the color of the fiber.

The process of making the color-changing fibers is depicted in FIG. 2. In essence, an electro-optic medium 20 is prepared comprising charged pigment particles in a non-polar solvent and the electro-optic medium 20 is then injected using a microsyringe 24, for example, into a fiber 22 having an internal cavity and at least two wire electrodes that can provide an electrical gradient across the fiber 22. Once the fiber 22 is filled with the electro-optic medium 20, the fiber 20 can be sealed with an adhesive. An alternate process of filling the fibers that may be more suited to producing continuous fiber lengths above 100 meters is to first prepare a partially-drawn fiber having an internal cavity that is larger than the intended final dimensions for the cavity, then insert ink into the cavity of the intermediate-sized fiber, and then finally to draw down the fiber to its final dimension using a draw tower or a fiber pulling system. This may avoid long fill times associated with moving a viscous fluid through a small cavity and over long lengths. Typically, the wire electrodes are left longer than the fiber. These wire "pigtails" can be the basis for electric connections to a driving circuit. Alternatively, the fiber walls can be ablated, stripped, or cut to make connections to the wire electrodes. Once the fibers are completed, they can be incorporated into a woven cloth 30, for example, as shown in FIG. 3 and electrically connected to an electronic driver 32 for switching the optical state of the fibers within the woven cloth 30. In particular, because the fibers of the invention are rectangular in cross section, they can be aligned to have the same face showing outward in the fabric. Of course, it is also possible to integrate these color changing fibers into a variety of other woven materials which can be used for interior design elements, architecture, wayfinding, etc.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Some of the materials and techniques described in the patents and applications listed below are relevant to fabricating variable transmission devices described herein, including:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

The electro-optic medium includes charged pigment particles in a suspending fluid. The fluids used in the variable transmission media of the present invention will typically be of low dielectric constant (preferably less than 10 and desirably less than 3). Especially preferred solvents include aliphatic hydrocarbons such as heptane, octane, and petroleum distillates such as Isopar® (Exxon Mobil) or Isane® (Total).

Charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, $ZnO$, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002,728, 9,366,935, and 9,372,380 as well as US Publication No. 2014-0011913, the contents of all of which are incorporated herein by reference in their entirety.

The particles may exhibit a native charge, or may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly (ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state. As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

EXAMPLE

Figure 4:
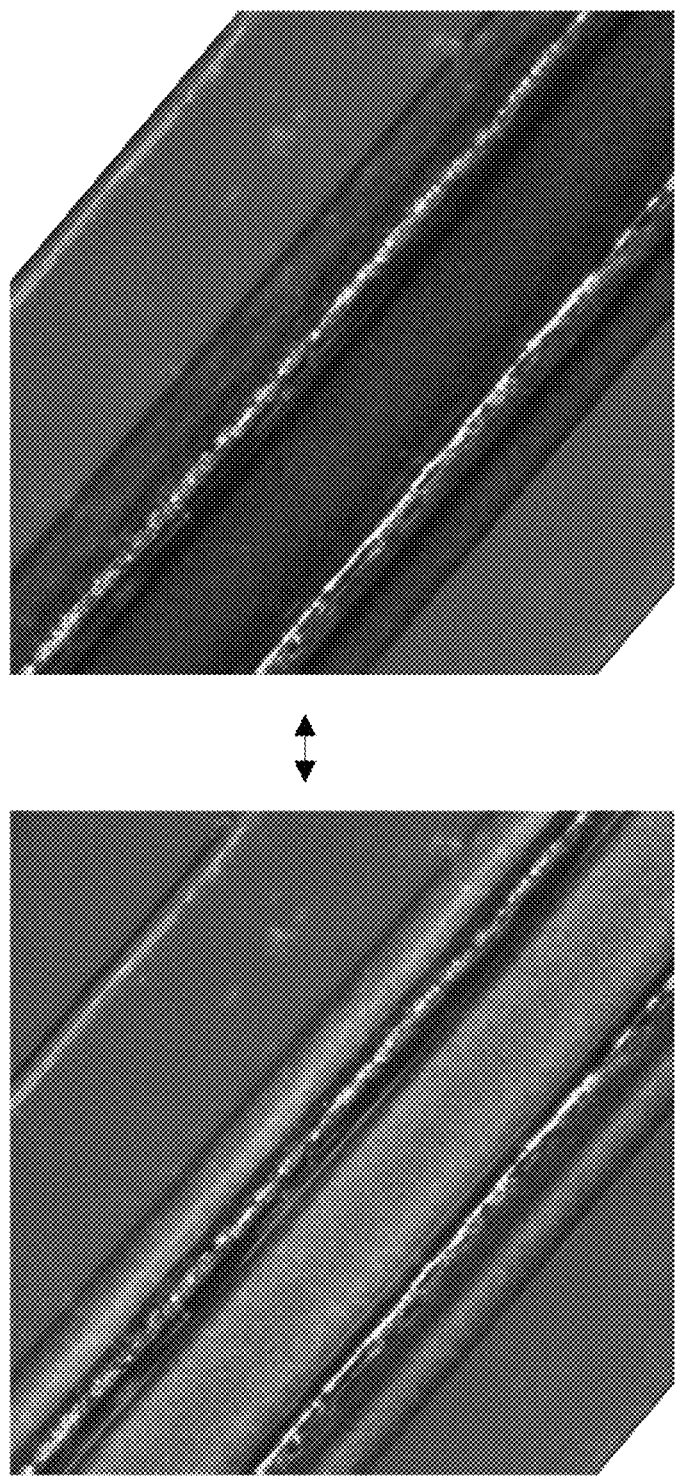
FIG. 4 shows visible light micrographs of a flexible color-changing fiber according to another embodiment of the invention being switched between a light state (left) and a dark state (right).

A polycarbonate fiber having four internal tungsten wire electrodes and a rectangular cross section was filled with an electro-optic medium comprising Isopar® and functionalized titania and black spinel particles. The fiber was approximately 0.8 mm×0.5 mm (exterior) with an internal cavity approximately 0.4 mm×0.2 mm. Two of the wire electrodes on one side were coupled to a voltage supply, while the other two wire electrodes were connected to ground. By providing +/− voltage signals between 100-500V to the wire electrodes, the fiber can be switched between white and black. (In general, the particles will switch at voltages +/−100 V, however the switching is markedly faster at higher voltages.) FIG. 4 shows visible light microscope images of a fiber switched between white (left) and black (right). The switching was repeated at least 100 times without any degradation of the fiber or the electro-optic medium. Additionally, with suitable voltage waveforms, the fibers will exhibit bistability. Using such waveforms, fibers of the type shown in FIG. 4 were made color-stable for over three days.

From the foregoing, it will be seen that the present invention can provide color-changing fibers that can be integrated into textiles and other materials. It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A flexible color-changing fiber comprising:
   a hollow fiber having a rectangular cross-section and comprising four electrically-isolated conductive wires that are integrated into the wall of the hollow fiber, wherein the wires are located about ¼ the width of a larger inner dimension of the rectangular cross section inward from the inner edge of the wall of the hollow fiber; and a bistable electro-optic medium disposed inside the hollow fiber, the bistable electro-optic medium comprising a non-polar solvent, first charged electrophoretic pigment particles, second charged electrophoretic pigment particles having a charge and color different from the first charged electrophoretic pigment particles, polymer stabilizers, and charge control agents, wherein the first charged electrophoretic pigment particles move toward two of the electrically-isolated conductive wires when an electric field is applied between the two sets of two electrically-isolated conductive wires, wherein the second charged electrophoretic pigment particles move away from the two electrically-isolated conductive wires that the first charged electrophoretic pigment particles move toward when an electric field is applied between the two sets of two electrically-isolated conductive wires, and wherein the first and second charged electrophoretic pigment particles maintain their position relative to the electrically-isolated conductive wires when an electric field is not applied between the two sets of two electrically-isolated conductive wires.

2. The flexible color-changing fiber of claim 1, wherein the hollow fiber comprises polymers.

3. The flexible color-changing fiber of claim 2, wherein the polymers comprise polycarbonate.

4. The flexible color-changing fiber of claim 1, wherein the rectangular cross section has a ratio of width to height of at least 1.2:1.

5. The flexible color-changing fiber of claim 1, wherein the conductive wires comprise tungsten.

6. The flexible color-changing fiber of claim 1, wherein the conductive wires comprise copper.

7. The flexible color-changing fiber of claim 1, further comprising an insulating layer between the at least two electrically isolated conductive wires.

8. The flexible color-changing fiber of claim 1, further comprising a conductive material between at least one of the electrically isolated conductive wires and the bistable electro-optic medium.

9. The flexible color-changing fiber of claim 8, wherein the conductive material comprises carbon.

10. The flexible color-changing fiber of claim 1, wherein the non-polar solvent is a mixture of hydrocarbons.

11. A fabric comprising a color-changing fiber of claim 1.

12. A flexible color-changing fiber comprising:

a hollow fiber having a rectangular cross-section and comprising four electrically-isolated conductive wires that are integrated into the wall of the hollow fiber, wherein the wires are located about ¼ the width of a larger inner dimension of the rectangular cross section inward from the inner edge of the wall of the hollow fiber;

a bistable electro-optic medium disposed inside the hollow fiber, the bistable electro-optic medium comprising a non-polar solvent, first charged electrophoretic pigment particles, second charged electrophoretic pigment particles having a charge and color different from the first charged electrophoretic pigment particles, polymer stabilizers, and charge control agents, wherein the first charged electrophoretic pigment particles move toward two of the electrically-isolated conductive wires when an electric field is applied between the two sets of two electrically-isolated conductive wires, wherein the second charged electrophoretic pigment particles move away from the two electrically-isolated conductive wires that the first charged electrophoretic pigment particles move toward when an electric field is applied between the two sets of two electrically-isolated conductive wires, and wherein the first and second charged electrophoretic pigment particles maintain their position relative to the electrically-isolated conductive wires when an electric field is not applied between the two sets of two electrically-isolated conductive wires; and one or more features providing lensing effects.

13. The flexible color-changing fiber of claim 12, wherein the features comprise a chamfered edge.

14. The flexible color-changing fiber of claim 12, wherein the features comprise a refractive coating about at least a portion of the outer surface of the fiber.

* * * * *